(12) United States Patent
Godler et al.

(10) Patent No.: US 9,451,135 B2
(45) Date of Patent: Sep. 20, 2016

(54) DRIVE UNIT FOR IMAGE CAPTURING DEVICE AND CONTROL METHOD THEREOF

(71) Applicants: Ivan Godler, Nogata (JP); Yasuomi Sato, Kitakyushu (JP); Hiroyuki Miyamoto, Kitakyushu (JP)

(72) Inventors: Ivan Godler, Nogata (JP); Yasuomi Sato, Kitakyushu (JP); Hiroyuki Miyamoto, Kitakyushu (JP)

(73) Assignee: Ivan Godler, Nogata (JP)

( * ) Notice: Subject to any disclaimer, the term of this patent is extended or adjusted under 35 U.S.C. 154(b) by 0 days.

(21) Appl. No.: 14/629,410

(22) Filed: Feb. 23, 2015

(65) Prior Publication Data

US 2016/0248949 A1 Aug. 25, 2016

(51) Int. Cl.
*H04N 5/225* (2006.01)
*H04N 5/247* (2006.01)

(52) U.S. Cl.
CPC ............ *H04N 5/2253* (2013.01); *H04N 5/247* (2013.01)

(58) Field of Classification Search
CPC ............................. H04N 5/232; H04N 7/185
See application file for complete search history.

(56) References Cited

U.S. PATENT DOCUMENTS

| | | | | | |
|---|---|---|---|---|---|
| 5,835,140 | A * | 11/1998 | Nakamura | ............ | H04N 5/232 348/211.12 |
| 6,130,993 | A * | 10/2000 | Hayakawa | ........... | G02B 27/646 348/E5.046 |
| 6,628,338 | B1 * | 9/2003 | Elberbaum | ........ | G08B 13/1963 348/373 |
| 6,744,565 | B1 * | 6/2004 | Kashitani | ............... | F16M 11/10 348/36 |
| 7,274,805 | B2 * | 9/2007 | Horie | ..................... | H04N 7/181 348/143 |
| 7,503,708 | B2 * | 3/2009 | Yang | ..................... | F16M 11/10 224/908 |
| 8,596,890 | B2 * | 12/2013 | Yim | ...................... | H04N 5/232 248/187.1 |
| 2004/0023684 | A1 * | 2/2004 | Sato | ..................... | H04M 1/0218 455/550.1 |
| 2015/0356841 | A1 * | 12/2015 | Lim | .................. | G08B 13/19619 348/143 |

* cited by examiner

*Primary Examiner* — Amy Hsu

(57) ABSTRACT

Drive unit that consists of two or more strings that are with one end attached to a shaft of a driving motor, and with the other end directly or indirectly coupled to an image capturing device, which is supported by means that allow rotation is disclosed. The twisting strings produce a pulling force on the ends of the strings, which generates a motion of the image capturing device. The invented drive unit does not use gears, belts, pulleys or the like, which reduces the weight, lowers the generated noise, and reduces the parts costs. The invented drive unit including the control unit achieves wide range of motion performances ranging from precise positioning to fast motion, including performance equivalent to a human eye.

6 Claims, 6 Drawing Sheets

DRIVE UNIT FOR IMAGE CAPTURING DEVICE AND CONTROL METHOD THEREOF

CROSS-REFERENCE TO RELATED APPLICATIONS

Japanese patent application: appl. (21) JP 2014-032653 (Feb. 24, 2014)

BACKGROUND OF THE INVENTION (1) Field of the Invention

The present invention relates to drive units for image capturing devices and control method thereof. The invented drive unit generates motion of the image capturing device or multiple image capturing devices by using twisted strings mechanism.

(2) Description of Related Art

Image capturing devices such as semiconductor cameras are used for surveillance and for robotic eyes, particularly in humanoid robots. Image capturing devices are immovably fixed to the base or are movable with the goal to increase visibility range of the device. Motion of the device can be generated by various types of motors that are directly coupled to the device (for example U.S. Pat. No. 6,628,338 B1) or coupled by gear and/or link mechanisms (for example U.S. Pat. No. 7,777,810 B2).

Particularly in the case of robotic eyes, fast motion of the image capturing device is needed to achieve motion that is similar to a human or live being's eye. A large torque is needed to realize fast motion, therefore, in the case of directly coupled motors, the motors become large and thus heavy. On the other hand, in the case of gear reducers used with the motor, the weight and size of the motors can be reduced, but the mechanisms generate noise, and the motion appearance is "too mechanical" to be suitable for humanoid robots, which should resemble eye motion of a live being.

What is still needed, is a drive unit for image capturing device that achieves motion performance similar to a human eye, that is, maximum angular speed of 900 angular degrees per second, operates quietly, is of small size and lightweight, and resembles motion of an eye of a live being.

BRIEF SUMMARY OF THE INVENTION

A drive unit of the present invention is composed of two or more strings that are with one end attached to a shaft of a driving motor, and with the other end directly or indirectly coupled to an image capturing device, which is supported by means that allow rotation. Rotation of the shaft of the driving motor twists the strings on each other. Twisting strings produce a pulling force on the ends of the strings, which generates a motion of the image capturing device. The rotation of the motor shaft is by the invented drive unit transmitted into rotation of the image capturing device.

The twisted strings function similarly to a muscle of a live being, that is, they generate a pulling force, and cannot push on the image capturing device. When returning motion of the image capturing device is needed, the strings are unwound, and motion of the image capturing device into returning direction is generated by another pair of strings or by a spring that is attached to the image capturing device in such a way that pulls or pushes into the direction opposite to the pulling of the twisted strings.

Additionally, the rotation of the motor shaft is controlled by a control unit, which uses external commands and a feedback signal in a form of detected rotational angle of the image capturing device or uses information from image processing of the image obtained from the image capturing device.

Moreover, in the case when two image capturing devices (semiconductor cameras in general) are used as a pair of robotic eyes or as a pair of cameras to obtain a three dimensional view, the invented drive units are used to drive each image capturing device separately or both simultaneously in a pan (left-right) direction, and each image capturing device separately or both simultaneously in a tilt (up-down) direction.

The invented drive unit does not use gears, belts, pulleys or the like, which reduces the weight, lowers the generated noise, and reduces the parts costs. The invented drive unit including the control unit achieves wide range of motion performances ranging from precise positioning to fast motion, including performance equivalent to a human eye, namely maximum rotational speed of 900 angular degrees per second.

Additional aspects and advantages of the invention will be apparent from the detailed description of preferred embodiments thereof with reference to the accompanying drawings.

BRIEF DESCRIPTION OF THE DRAWINGS

The accompanying drawings show embodiments of the invention of which

DETAILED DESCRIPTION OF PREFERRED EMBODIMENTS

Figure 1:
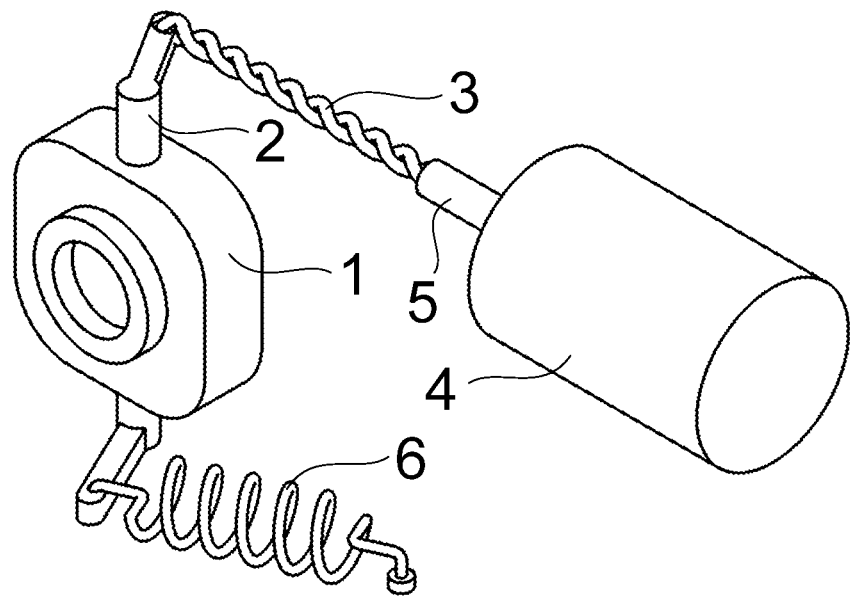
FIG. 1 is an isometric view of a drive unit in accordance with the invention.

FIG. 1 shows an isometric view of a drive unit where two or more strings 3 are with one end attached to a shaft 5 of a driving motor 4, and with the other end are coupled to a member 2, which is fixed to the image capturing device 1, and supports the image capturing device 1 so that it can rotate around its vertical axis. Rotation of the shaft 5 twists the strings 3 and thus generates a pulling force on the member 2, which rotates together with the image capturing device 1 around its vertical axis. A spring 6 is directly or indirectly attached to the image capturing device 1 in such a way that generates a motion of the image capturing device 1 in opposite direction to the pulling direction of the twisted strings 3. The twisted strings 3 and the spring 6 thus operate as an antagonistic pair on the image capturing device 1, with a function to rotate the image capturing device 1 around its vertical axis in both directions.

Figure 2:
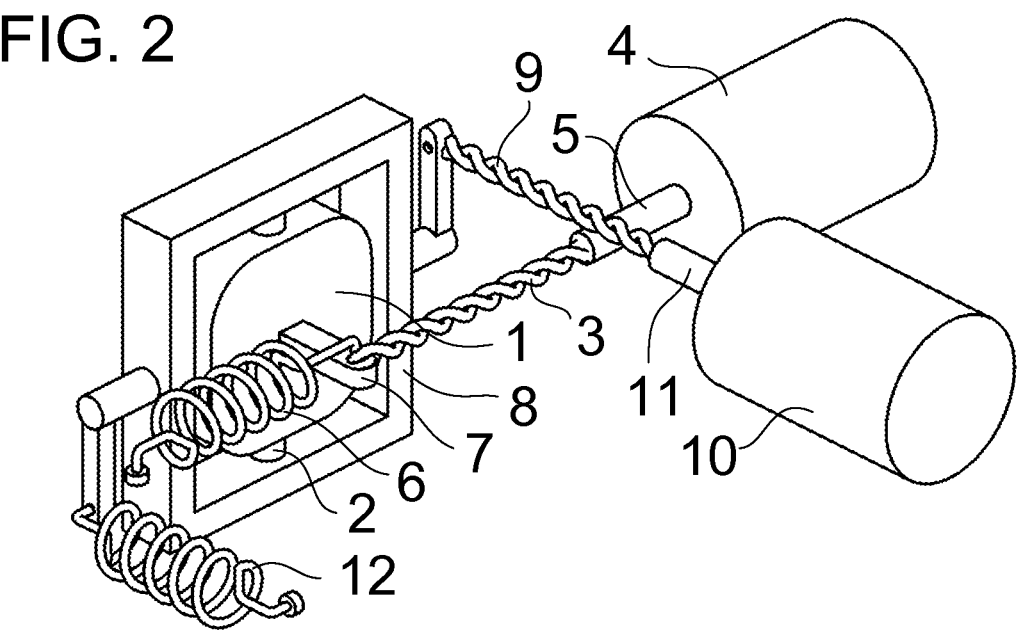
FIG. 2 is an isometric view of embodiment in accordance with the invention where two drive units are implemented to drive an image capturing device in two separate directions.

FIG. 2 shows an image capturing device 1 attached by a member 2 to a frame 8, so that the image capturing device 1 can freely rotate around its vertical axis in the frame 8. The frame 8 is supported by means not shown in the figure in such a way that the frame 8 can freely rotate around its horizontal axis. Two or more strings 3 are with one end attached to a shaft 5 of a driving motor 4 and with the other end are coupled to a member 7, which is fixed to the image capturing device 1. Rotation of the shaft 5 twists the strings 3 and thus generates a pulling force on the member 7, which rotates together with the image capturing device 1 around its vertical axis. A spring 6 is attached to the member 7 in such a way that generates a force opposite to the pulling force of the twisted strings 3. Further on, two or more strings 9 are with one end attached to a shaft 11 of a second driving motor 10, and with the other end are coupled directly or indirectly to the frame 8. Rotation of the shaft 11 twists the strings 9 and thus generates a pulling force on the frame 8, which rotates together with the image capturing device 1 around its horizontal axis. A spring 12 is attached to the frame 8 in such a way that it generates a force opposing to the pulling force of the twisted strings 9. The twisted strings 3 and the spring 6, and the twisted strings 9 and the spring 12 both separately operate as antagonistic pairs to rotate the image capturing device 1 around its vertical axis and around its horizontal axis in both directions independently.

Figure 3:
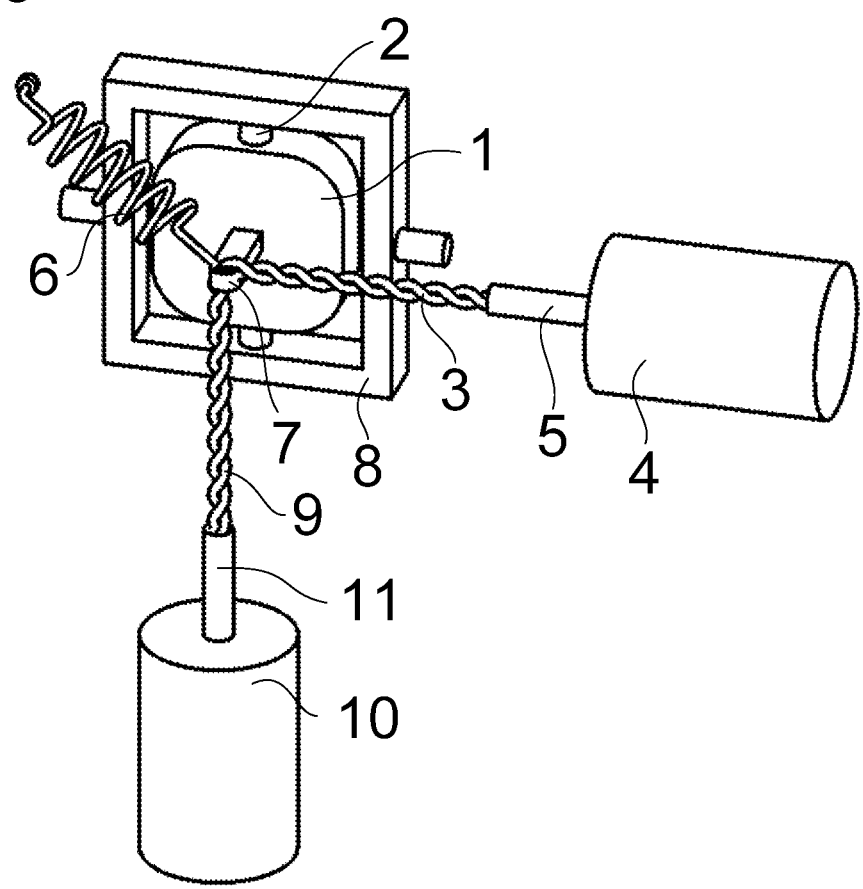
FIG. 3 is a view of another embodiment of the invention where two drive units are implemented to drive an image capturing device in two separate directions.

FIG. 3 shows another embodiment of driving unit of FIG. 2 where the twisted strings 3 and 9 are both attached to the member 7, and the spring 6 is also coupled to the member 7. This arrangement contributes to reduced number of parts needed to drive the image capturing device 1 around its horizontal and around its vertical axes independently.

Figure 4:
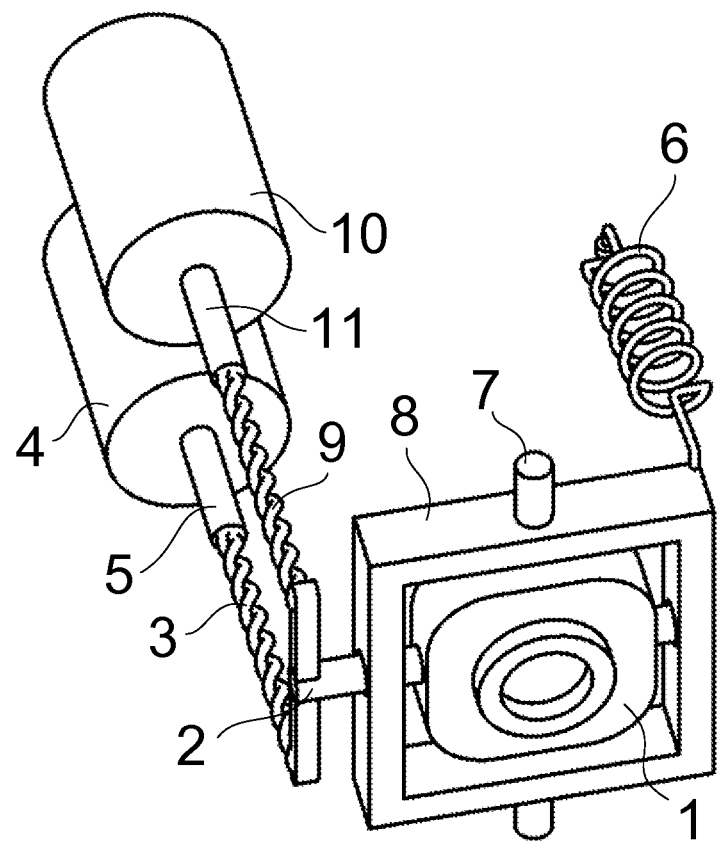
FIG. 4 is a view of embodiment in accordance with the invention where two drive units are implemented as antagonistic pair.

FIG. 4 shows yet another embodiment of driving unit of FIG. 2 where the twisted strings 3 and 9 are both attached to a member 2 in such a way that they operate as an antagonistic pair to rotate the image capturing device 1 around its horizontal axis, and simultaneously both operate as an antagonistic pair with the spring 6 to rotate the image capturing device 1 around its vertical axis. Namely, when the strings 3 are twisting and the strings 9 are untwisting, the pulling force on the member 2 works in such a way that the image capturing device 1 is in the frame 8 rotated around its horizontal axis to tilt down, and oppositely, when the strings 3 are untwisting and the strings 9 are twisting, the pulling force on the member 2 works in such a way that the image capturing device 1 in the frame 8 rotates around its horizontal axis to tilt up. On the other hand, when the strings 3 and the strings 9 are both twisting, the pulling force on the member 2 works in such a way that the image capturing device 1 is together with the frame 8 rotated around its vertical axis to pan right, and oppositely, when the strings 3 and the strings 9 are both untwisting, the pulling force on the frame 8 by the spring 6 works in such a way that the image capturing device 1 is together with the frame 8 rotated around its vertical axis to pan left. In this embodiment the motors are aligned in the direction behind the image capturing axis of the image capturing device contributing a favorable configuration for assembly into a robotic head.

Figure 5:
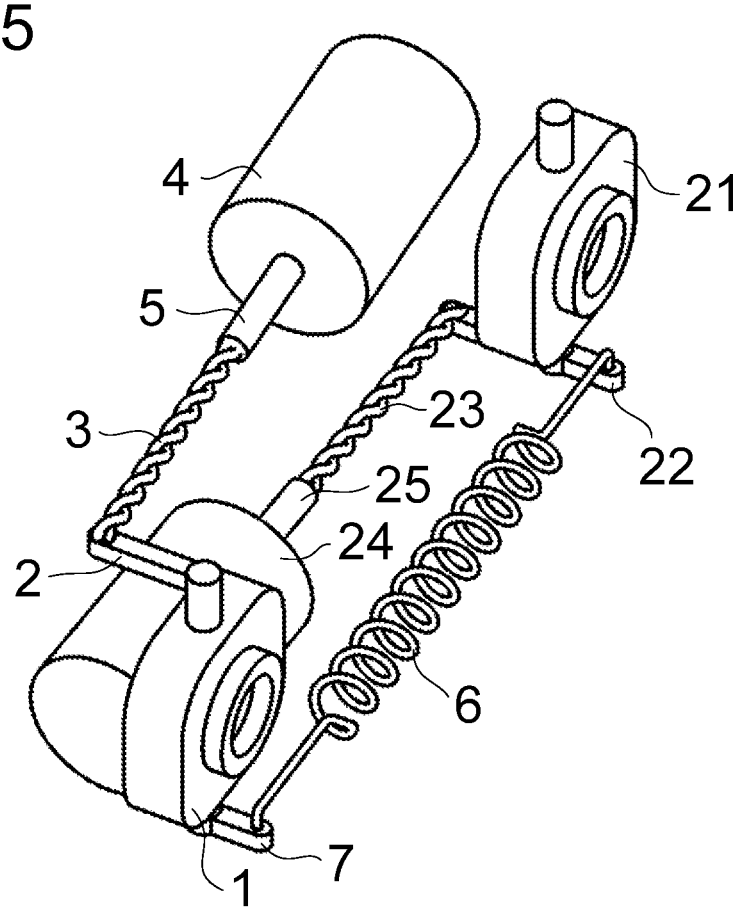
FIG. 5 is an isometric view of embodiment in accordance with the invention where two drive units are implemented to drive two separate image capturing devices.

FIG. 5 shows an isometric view of embodiment where two or more strings 3 are with one end attached to a shaft 5 of a driving motor 4, and with the other end are coupled to a member 2, which is fixed to the image capturing device 1, and supports the image capturing device 1 so that it can rotate around its vertical axis. Rotation of the shaft 5 twists the strings 3 and thus generates a pulling force on the member 2, which rotates together with the image capturing device 1 around its vertical axis. A spring 6 is directly or indirectly coupled to the image capturing device 1 in such a way that generates a motion of the image capturing device 1 in opposite direction to the pulling direction of the twisted strings 3. The twisted strings 3 and the spring 6 thus operate as an antagonistic pair on the image capturing device 1, with a function to rotate it around its vertical axis in both directions. Additionally two or more strings 23 are with one end attached to a shaft 25 of a driving motor 24, and with the other end are coupled to a member 22, which is fixed to the second image capturing device 21, and supports the second image capturing device 21 so that it can rotate around its vertical axis. Rotation of the shaft 25 twists the strings 23 and thus generates a pulling force on the member 22, which rotates together with the second image capturing device 21 around its vertical axis. The spring 6 is directly or indirectly coupled to the image capturing device 21 in such a way that generates a motion of the second image capturing device 21 in opposite direction to the pulling direction of the twisted strings 23. The twisted strings 23 and the spring 6 thus operate as an antagonistic pair on the image capturing device 21, with a function to rotate it around its vertical axis in both directions. The spring 6 in this embodiment is coupled to both image capturing devices, and as such contributes to reduced fluctuations of the spring force in the case of stereo camera or robotic eyes, where the two image capturing devices 11 and 21 both mostly pan (rotate left and right) for the same amount of angle.

Figure 6:
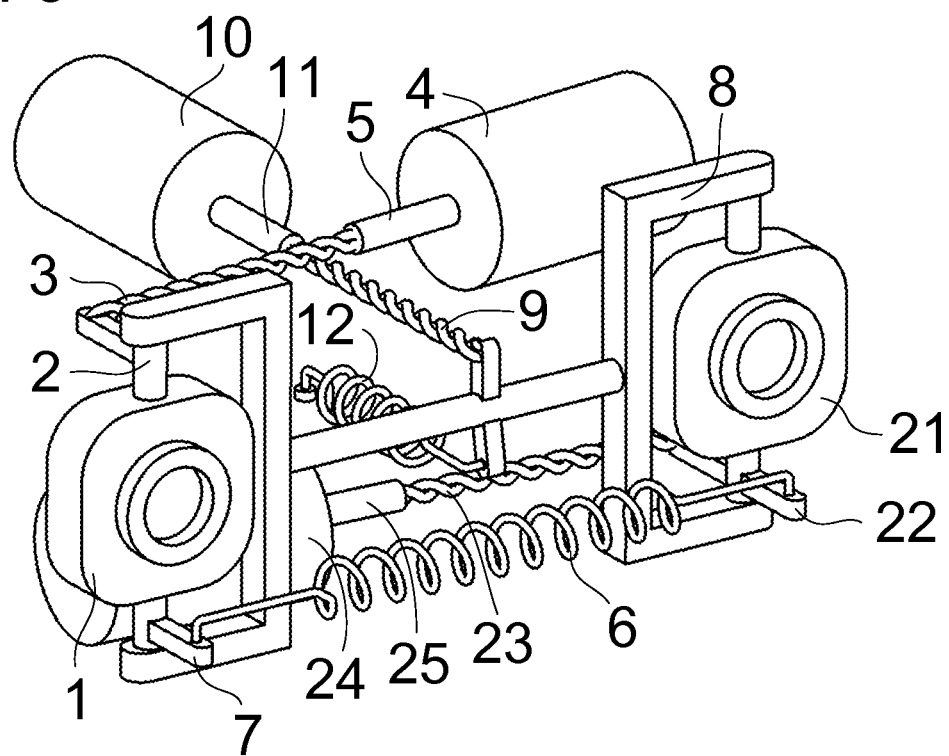
FIG. 6 is an isometric view of embodiment in accordance with the invention where two drive units are implemented to drive two separate image capturing devices independently in pan direction, and one drive unit to drive two image capturing units simultaneously in tilt direction.

FIG. 6 shows an isometric view of embodiment where two or more strings 3 are with one end attached to a shaft 5 of a driving motor 4, and with the other end are coupled to a member 2, which is fixed to the image capturing device 1, and supports the image capturing device 1 so that it can rotate around its vertical axis. Rotation of the shaft 5 twists the strings 3 and thus generates a pulling force on the member 2, which rotates together with the image capturing device 1 around its vertical axis. A spring 6 is directly or indirectly attached to the image capturing device 1 in such a way that generates a motion of the image capturing device 1 in opposite direction to the pulling direction of the twisted strings 3. The twisted strings 3 and the spring 6 thus operate as an antagonistic pair on the image capturing device 1, with a function to rotate it around its vertical axis in both directions. Additionally two or more strings 23 are with one end attached to a shaft 25 of a driving motor 24, and with the other end are coupled to a member 22, which is fixed to the second image capturing device 21, and supports the second image capturing device 21 so that it can rotate around its vertical axis. Rotation of the shaft 25 twists the strings 23 and thus generates a pulling force on the member 22, which rotates together with the second image capturing device 21 around its vertical axis. The spring 6 is directly or indirectly attached to the image capturing device 21 in such a way that generates a motion of the second image capturing device 21 in opposite direction to the pulling direction of the twisted strings 23. The twisted strings 23 and the spring 6 thus operate as an antagonistic pair on the image capturing device 21, with a function to rotate it around its vertical axis in both directions. The spring 6 in this embodiment is coupled to both image capturing devices, and as such contributes to reduced fluctuations of the spring force in the case of stereo camera or robotic eyes, where the two image capturing devices 11 and 21 both mostly pan (rotate left and right) for the same amount of angle. Additionally, the image capturing devices 1 and 21 are both by their respective members 2 and 22 attached to a common frame 8, which is supported by means not shown in the figure in such a way that the frame 8 can freely rotate around its horizontal axis. Two or more strings 9 are with one end attached to a shaft 11 of a driving motor 10 and with the other end are coupled to the frame 8.

Rotation of the shaft 11 twists the strings 9 and thus generates a pulling force on the frame 8 in such a way that frame 8 rotates and with it rotate both image capturing devices 1 and 21 around their horizontal axes. A spring 12 is attached to the frame 8 in such a way that generates a force opposite to the pulling force of the twisted strings 9. The twisted strings 9 and the spring 12 operate as an antagonistic pair to rotate the frame 8 and with it both image capturing devices 1 and 21 around horizontal axis in both directions.

Figure 7:
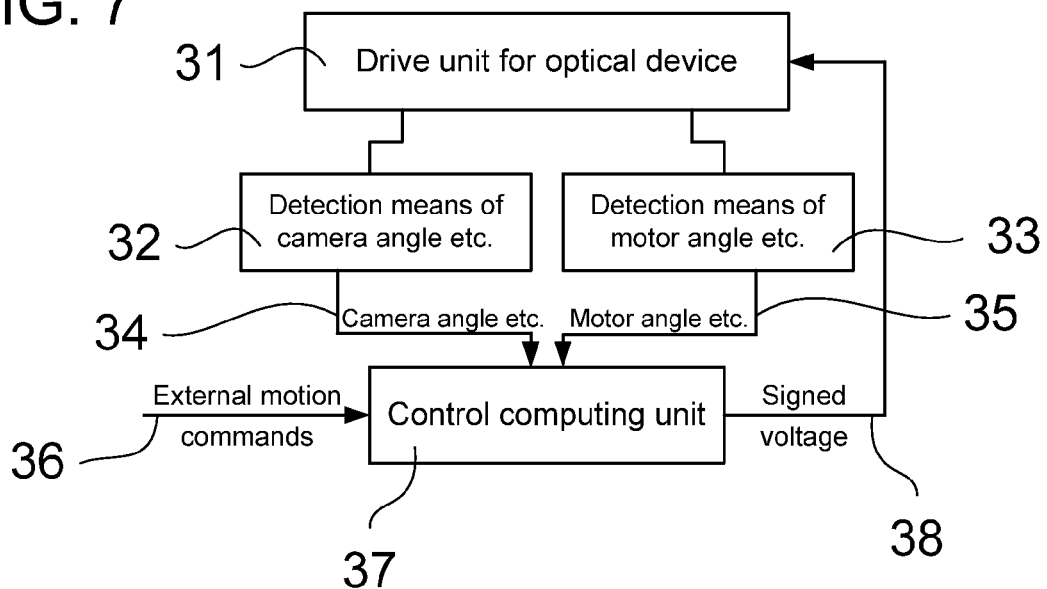
FIG. 7 is a block diagram of control system in accordance with the invention to control the invented drive unit.

A block diagram of control system to control drive unit is shown in FIG. 7, where drive unit for image capturing device 31 has detection means of camera angle or speed 32, and detection means of motor angle or speed 33. The control computing unit 37 receives external motion command 36, and by using image capturing device's angle or speed 34 and motor angle or speed 35, calculates according to control algorithm a needed signed voltage 38, which is transmitted to the driving motor in the drive unit for image capturing device 31 to achieve desired motion performance.

Figure 8:
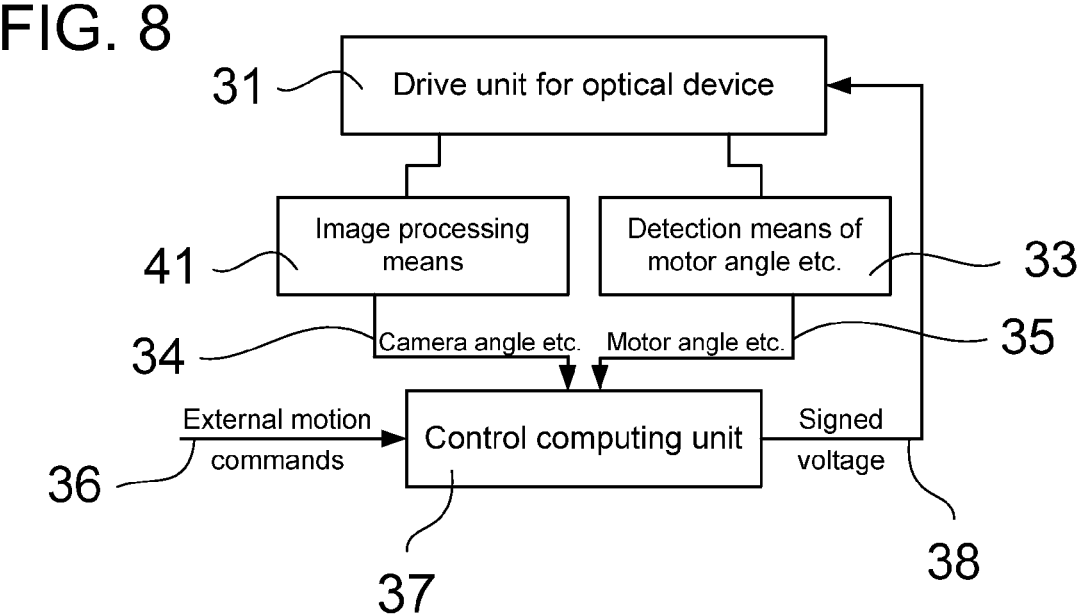
FIG. 8 is another block diagram of control system in accordance with the invention to control the invented drive unit.

FIG. 8 shows another embodiment of control system to control drive unit of FIG. 7 where image processing means 41 are used to obtain image capturing device's angle or speed 34. This arrangement contributes to reduced number of parts needed to control the driving unit, because the image capturing device's angle or speed etc. are obtained from an image processing of the signal from the image capturing device, thus the detection means of camera angle or speed are not separately needed.

The invention is not limited to the above embodiments and various modifications may be made without departing from the spirit and scope of the invention. Any improvement may be made in part or all of the components.

What is claimed is:

1. A drive unit comprising at least two flexible linking members, a driving motor with a rotational shaft to which said flexible linking members have ends connected at the center of rotation of said rotational shaft, an image capturing unit to which said flexible linking members have the other ends connected with the effect to rotate said image capturing unit by a pulling force generated by said flexible linking members twisting or untwisting on each other according to rotation of said rotational shaft, and an elastic member connected to said image capturing unit with the effect to generate an opposing force to said pulling force generated by said flexible linking members.

2. A drive unit comprising two sets of at least two flexible linking members, two driving motors with a rotational shaft to which each said sets of flexible linking members have ends connected at the center of rotation of each said rotational shaft, an image capturing unit to which said sets of flexible linking members have the other ends connected with the effect to rotate said image capturing unit around two orthogonal axes by pulling forces generated by said sets of flexible linking members each separately twisting or untwisting according to rotation of each said rotational shafts, and an elastic member connected to said image capturing unit with the effect to generate opposing force to said pulling forces generated by said sets of flexible linking members.

3. A drive unit comprising two sets of at least two flexible linking members, two driving motors with a rotational shaft to which each said sets of flexible linking members have ends connected at the center of rotation of each said rotational shaft, two image capturing units to each said sets of flexible linking members have the other ends connected with the effect to rotate said image capturing units by pulling forces generated by said sets of flexible linking members each twisting or untwisting according to rotation of each of said rotational shafts, and an elastic member connected to said image capturing units with the effect to generate opposing force to said pulling forces generated by said sets of flexible linking members.

4. The drive unit of claim 3, further including a third set of at least two flexible linking members, a third driving motor with a rotational shaft to which said third set of flexible linking members have ends connected at the center of rotation of said rotational shaft, a pivoting member supporting said two image capturing units to which said third set of flexible linking members have the other ends connected with the effect to rotate said pivoting member and said capturing units in direction orthogonal to said rotation of said image capturing units by a pulling force generated by said third set of flexible linking members twisting or untwisting on each other according to rotation of said third rotational shaft, and a second elastic member connected to said pivoting member with the effect to generate opposing force to said pulling force generated by said third flexible linking members.

5. The drive units of claims 1 to 3 in which sensing means to detect rotational angle of image capturing units, sensing means to detect rotational angle of rotational shafts, sensing means to detect pulling force on motion elements, means to control relative or absolute position or speed or rotational torque or pulling force are employed in any combination of said sensing means and said control means to control driving motors.

6. The drive units of claims 1 to 3 in which said image capturing units output signal is used as sensing means to detect rotational angle of image capturing units, sensing means to detect rotational angle of rotational shafts, sensing means to detect pulling force on motion elements, means to control relative or absolute position or speed or rotational torque or pulling force are employed in any combination of said sensing means and said control means to control driving motors.

* * * * *